United States Patent [19]

Fill et al.

[11] 4,272,681
[45] Jun. 9, 1981

[54] METHOD AND APPARATUS FOR ISOTOPE-SELECTIVELY EXCITING GASEOUS OR VAPOROUS URANIUM HEXAFLUORIDE MOLECULES

[75] Inventors: Ernst E. Fill, Garching; Heinz L. Jetter, Feldkirchen-Westerham; Reinhard Volk, Munich, all of Fed. Rep. of Germany

[73] Assignee: Uranit Uran-Isotopentrennungs-Gesellschaft mbH, Jülich, Fed. Rep. of Germany

[21] Appl. No.: 969,939

[22] Filed: Dec. 15, 1978

[30] Foreign Application Priority Data

Mar. 2, 1978 [DE] Fed. Rep. of Germany ....... 2808955

[51] Int. Cl.$^3$ .............................................. H01J 27/00
[52] U.S. Cl. ...................... 250/423 P; 204/DIG. 11; 250/281
[58] Field of Search ................... 250/423 P, 281, 282, 250/283; 204/151.1 R, DIG. 11; 423/2, 249

[56] References Cited

U.S. PATENT DOCUMENTS

3,937,956  2/1976  Lyon .................................. 250/283
4,061,921  12/1977  Cantrell ........................... 250/423 P
4,158,139  6/1979  Rostler ............................. 250/423 P

*Primary Examiner*—Harold A. Dixon
*Attorney, Agent, or Firm*—Spencer & Kaye

[57] ABSTRACT

A method of isotope-selectively exciting gaseous or vaporous uranium hexafluoride molecules by subjecting them to the action of a monochromatic iodine laser beam, the frequency of which can be adjusted and tuned to an absorption band of the molecules to be excited, the laser beam being scattered by liquid and/or solid nitrogen to obtain a triple Raman-scattering. In a preferred embodiment, the laser has an emission frequency of 7600 to 7610 cm$^{-1}$ and the tuning is effected by means of a magnetic field.

An apparatus suitable for carrying out such a method comprises a high-performance iodine laser and an optical resonator into which the emission beam or pulses of the laser are focused, one or more Dewar vessels filled with liquid or solid nitrogen being located within the optical resonator. In a preferred embodiment, the laser beam tube is located between the poles of an electromagnet.

7 Claims, 4 Drawing Figures

METHOD AND APPARATUS FOR ISOTOPE-SELECTIVELY EXCITING GASEOUS OR VAPOROUS URANIUM HEXAFLUORIDE MOLECULES

The present invention relates to a method and an apparatus for the isotope-selective excitation of gaseous or vaporous uranium hexafluoride molecules by means of monochromatic laser radiation, the frequency of which can be altered and which is tuned to an absorption band of the molecules to be excited.

Methods of separating uranium isotopes by using an infra-red laser beam are known. These methods use uranium hexafluoride ($UF_6$) which is volatile. In a first stage, the molecules in the $UF_6$ gas containing a specific isotope are excited by means of an infra-red laser. In one or more further stages, different chemical or physical methods are employed to separate the molecules excited in the first stage.

Since the strongest infra-red absorption band of the $UF_6$ molecule at room temperature lies within the wavelength region $\lambda = 16$ μm (corresponding to a wave number of 615–635 $Cm^{-1}$), the excitation by the laser beam should also occur in this region. At temperatures at which the uranium hexafluoride has a sufficient vapour pressure, that is to say, above 250° K., the absorption bands of the molecule are, however, less well structured. Moreover, the molecular spectra of compounds containing different uranium isotopes substantially completely overlap.

The isotope-specific excitation cannot therefore, be carried out under these conditions with the necessary selectivity. However, it is also known that $UF_6$-gas may be cooled by expansion from a supersonic nozzle to a temperature below 50° K. without condensation or sublimation occurring. The absorption spectrum of the molecule is characteristically different at low temperatures. Instead of an unstructured band, the spectrum for each isotope has an intense narrow line (the Q-line of the molecule) which is, at times, surrounded by considerably weaker, substantially equidistant lines (the P- and R- lines). The width of this central, thick line diminishes with temperature and at 50° K. is about 0.05 $cm^{-1}$. The spacing between the corresponding lines for the isotope $^{235}U$ and $^{238}U$ is about 0.7 $cm^{-1}$ and hence, at this temperature, the spacing is substantially greater than the width of the line.

However, certain difficulties arise in producing a laser beam which has a sufficient narrow frequency band to be tunable accurately to one of these lines.

The present invention seeks to provide a method utilizing low temperature which has maximum selectivity with regard to the excitation of the $UF_6$ molecules.

According to the present invention there is provided a method of isotope-selectively exciting gaseous or vaporous uranium hexafluoride molecules by means of a monochromatic iodine laser beam having an adjustable frequency in which the beam frequency is tuned to an absorption band of the molecules to be isotope-selectively excited, wherein the iodine laser beam is scattered in liquid and/or solid nitrogen and the beam produced by triply stimulated Raman-scattering is brought into interaction with the uranium hexafluoride molecules.

Also according to the present invention there is provided an apparatus for isotope-selectively exciting gaseous or vaporous uranium hexafluoride molecules comprising a high performance iodine laser, an optical resonator into which the emission pulses or beam of the iodine laser are focused, and one or more Dewar vessels filled with liquid or solid nitrogen located within the optical resonator.

The light produced by triple Raman-scattering of an iodine laser beam in liquid and/or solid nitrogen also has a laser character with a line width which is substantially exactly one-half of width of the relevant absorption lines, the Q-lines of highly cooled $UF_6$. By suitable frequency displacement or adjustment, this line can be caused to overlap an absorption line of the $UF_6$ molecules containing a specific isotope, so that the selected isotope molecules are excited and caused to vibrate. Physical or chemical separating methods may then be used to separate the excited molecules from the non-excited molecules.

The invention will be further described, by way of example, with reference to the accompanying drawings, in which.

Figure 1:
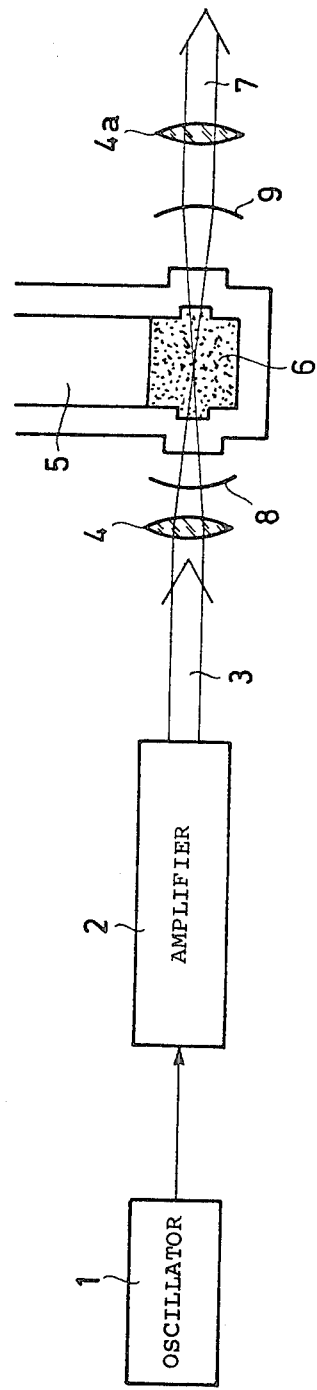
FIG. 1 shows, schematically, a high performance iodine laser comprising an oscillator and an amplifier and including a Dewar vessel located within an optical resonator.

Referring first to FIG. 1, an iodine laser comprises an oscillator 1 and an amplifier 2. The beam is produced by excited iodine atoms, which are themselves produced by photolysis of an iodine-containing compound. The output frequency ($\bar{\nu}$) is 7603.3 $cm^{-1}$. An arrangement of this type is described in the prior art in which the iodine laser is operated at a high pulse rate or output of the order of several Gigawatts considerable repeat frequency (up to one Kilohertz) and favourable efficiency (approximately 3%).

The output pulses 3 of the iodine laser 1,2, which typically have a pulse duration of 30 ns, are focused with a lens 4 in a Dewar vessel 5 containing liquid nitrogen 6. Thus, by Raman-scattering, light is emitted, the frequency of which is displaced by an amount ($\bar{\nu}N_2$) of 2326.5 $cm^{-1}$ characteristic of liquid nitrogen relative to the frequency of the iodine laser beam 3, towards a lower value. This is the Stokes displacement. For a certain intensity of the iodine laser light, which is dependent upon focussing conditions, the light produced by Raman-scattering is also of laser character; i.e. it is coherent both in time and spatially. With this stimulated Raman-scattering, the iodine laser light is almost completely converted into a Stokes displacement beam. The intensive radiation thus produced has, in turn, a further frequency displacement imparted thereto by stimulated Raman-scattering. With a triple Stokes displacement, utilising an iodine laser beam in liquid nitrogen, the frequency $\bar{\nu}$ is reduced to 7603.3−(3×2326.5) which is 623.8 $cm^{-1}$. This value corresponds to the major $UF_6$ absorption band at room temperature. With an iodine laser beam 3 having an output of about 1 Gigawatt, outputs are obtained of the thrice Raman-scattered light 7 of the order of a few Megawatts.

In order to obtain optimal conversion of the laser light in the required radiation region, the Dewar vessel provided with liquid nitrogen is arranged within an optical resonator 8,9. Thus, the curved mirror 8 is so arranged by means of dielectric layers so that it is transparent to the iodine laser beam 3 and is highly reflecting for the different Stokes components of the scattered light. The mirror 9 is selectively transparent for the third Stokes component of the laser and is reflecting for the other wavelengths. This arrangement ensures that the iodine laser beam 3 itself and the first and second Stokes components repeatedly permeate the scattering space 6 and hence substantially complete conversion of the laser light into the third Stokes component 7 is attained, which component is focused by means of a lens 4a.

Figure 2:
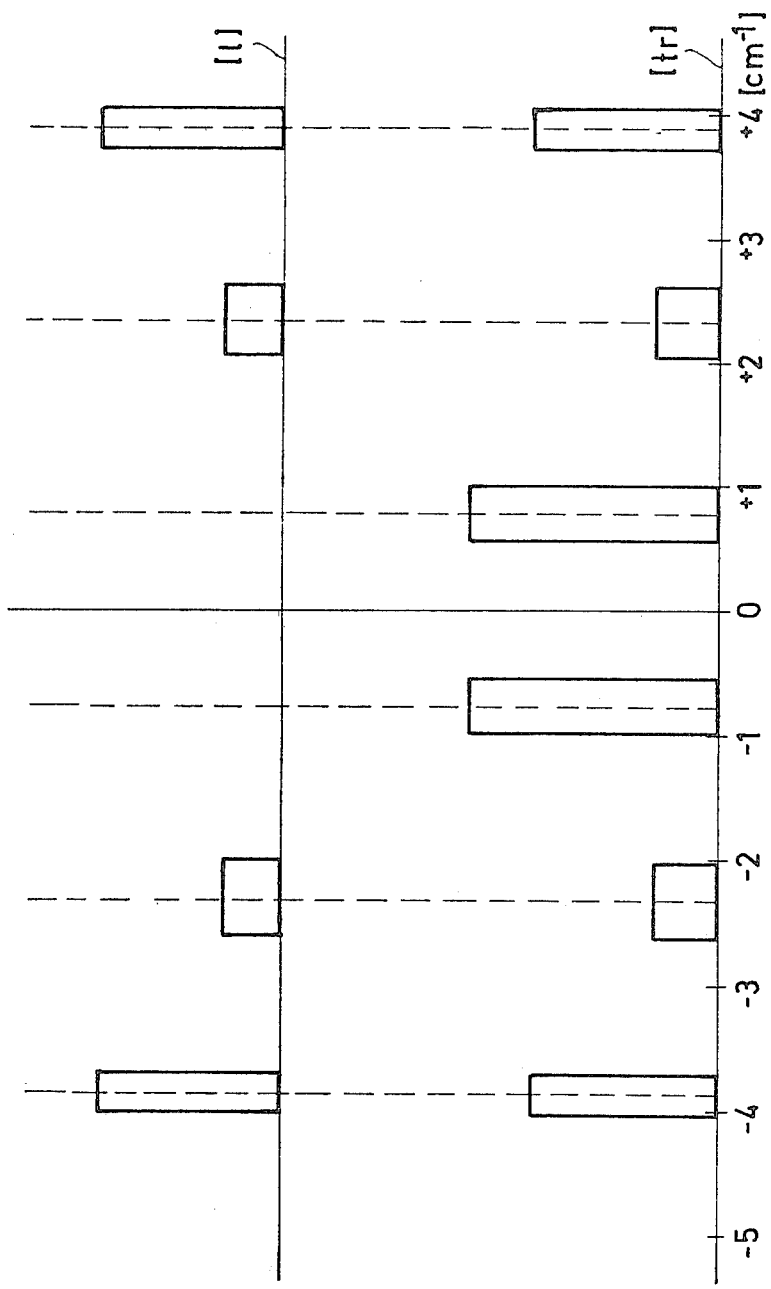
FIG. 2 shows the frequency displacement of the iodine laser beam caused by a longitudinal and a transverse magnetic field.

For the excitation of specific uranium isotopes in $UF_6$, radiation within the range of 627 to 629 $cm^{-1}$ is necessary. This is attained if the output 3 of the iodine laser 1,2 is displaced towards higher frequencies by operating the laser in a magnetic field. By the Zeeman effect, the relevant levels for the laser activity of the iodine atoms are separated. FIG. 2 shows the separation in the longitudinal (1) and transverse (tr) magnetic field by a field intensity of 50 K-gauss. In the transversal magnetic field, for example, for the components which are polarised in the direction of the magnetic field lines, a frequency shift of $\pm 4$ $cm^{-1}$ is obtained.

Figure 3A:
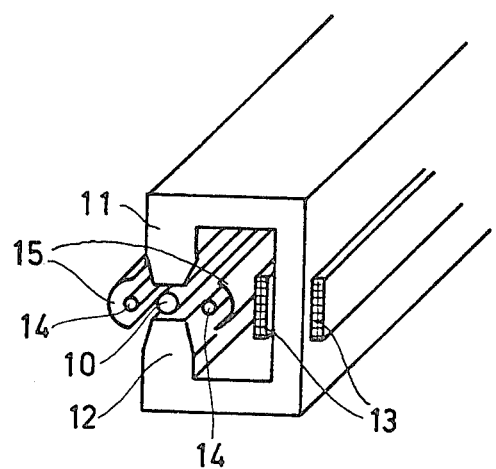
FIGS. 3a and 3b show parts of a preferred arrangment of an iodine laser having magnetic frequency tuning.
Figure 3B:
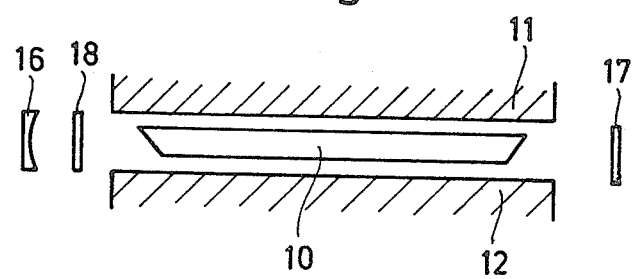

FIGS. 3a and 3b show portions of a preferred arrangement for the magnetic tuning of an iodine laser. A transverse magnetic field is used in this case. FIG. 3a shows a cross-section through the laser. A laser tube 10 containing the iodine compounds is located between the poles 11,12 of a longitudinally extending electromagnet 13. Parallel to the laser tube 10 are provided flash lamps 14 together with the associated reflectors 15 for the photolysis of the iodine compound. In this arrangement, the flash lamps 14 may be located at the necessarily small spacing from the laser tube without being substantially influenced by the magnetic field.

In FIG. 3b, a longitudinal section through the laser is shown. The resonator is formed by a completely reflecting mirror 16 and a partially transmitting mirror 17. Within the resonator, a polarisation filter 18 is provided which only permits light having a direction of polarisation coinciding with the direction of the magnetic field to oscillate. By means of the magnetic field, the range in which the laser medium shows optical amplification can be displaced. The fine tuning within this range is effected by means of known techniques, for example, by an Etalon.

The high laser output necessary for use is preferably produced in an oscillator-amplifier arrangement. In the arrangement shown in FIGS. 3a and 3b, there is firstly produced a laser beam of low output but of the required frequency and the requisite narrow band width. This beam is then amplified in one or more amplifiers to the required output level. From the oscillator a plurality of amplifier chains may be operated in parallel so that, simultaneously, a plurality of $UF_6$ gas beams may be excited. Since the oscillator needs to provide only a small output, it may have a compact structure and may therefore be made both mechanically and thermally stable. Moreover, the homogeneity required for a lesser line width of the magnetic field may be achieved substantially more easily in a small magnetic field. With the amplifiers being end-connected, the requirements for mechanical stability and homogeneity of the magnetic field are substantially less.

The arrangement described in the embodiment thus offers the possibility of producing a continuously tuneable laser radiation of high performance in the region relevant to uranium isotope separation. It is thus favourable for the Raman-scattering to occur in liquid or solid nitrogen. Of all the substances which have been investigated, liquid nitrogen has the highest amplification factor for excited Raman-scattering. The conversion of the laser light into Raman displaced radiation therefore occurs with relatively low intensities and a high conversion factor. A further advantage of liquid nitrogen is that it has a small Raman line width. This is approximately 0.06 $cm^{-1}$ which corresponds almost exactly to one-half of the width of the absorption line (Q-line) in highly cooled $UF_6$ ($T<50°$ K.). Hence all rotational states lying below the Q-line may be excited without the necessity for any rotation relaxation. The laser radiation is thus optimally employed and excitation occurs strictly isotope- specifically, since the isotope displacement is substantially greater than the excitation line width.

In a further development of the method, the Raman-scattering takes place in capillaries filled with liquid nitrogen. Thus, the iodine laser light is focussed into the capillaries which act as wave conductors. Within the capillaries, over a relatively long length (compared to the diameter of the capillaries) a high intensity flat wave is obtained. On account of the considerable interaction length, an excited Raman-scattering may be attained with a small pump output, so that the laser can be operated to give a continuous wave signal or long pulses. Independently of the irradiated pump output in this arrangement, an optimal conversion into the third Stokes component is obtained by suitably selecting the lengths of the capillaries.

In accordance with the present invention, solid nitrogen may also be used as the scattering medium. The frequency displacement, the line width and the amplification factor of the stimulated Raman-scattering is comparable with that achieved with liquid nitrogen. Depending upon the wavelength required, the triple scattering may thus be achieved using solid or liquid nitrogen or both scattering media may be used simultaneously and combinations of the scattering occurring in the two phases may be utilised.

The invention is not, however, restricted to the embodiment which has been shown and described. Thus, for example, the iodine laser may be permeated longitudinally by a magnetic field. It is also possible to connect several Dewar vessels in series, the light being scattered once in each vessel and then being conducted into the next vessel. From the last vessel, the triply scattered light is displaced and brought into interaction with the uranium hexafluoride molecules.

We claim:

1. A method of isotope-selectively exciting gaseous or vaporous uranium hexafluoride molecules by means of a monochromatic iodine laser beam having an adjustable frequency, in which the beam frequency is tuned to an absorption band of the molecules to be isotope-selectively excited wherein the iodine laser beam is scattered in liquid and/or solid nitrogen and the beam produced by triply stimulated Raman-scattering is brought into interaction with the uranium hexafluoride molecules.

2. A method as claimed in claim 1, wherein the emission frequency of the iodine laser lies in the wave number range of 7600 to 7610 $cm^{-1}$ and tuning is effected by means of a magnetic field permeating the iodine laser, the magnetic field being so selected that the light produced by the threefold stimulated Raman-scattering overlaps with an absorption band of the molecules to be excited.

3. A method as claimed in claim 2 wherein the magnetic field permeates the iodine laser in a direction which is transverse to the direction of the laser beam.

4. An apparatus for isotope-selectively exciting gaseous or vaporous uranium hexafluoride molecules comprising a high performance iodine laser, an optical resonator into which the emission pulses or beam of the iodine laser are focused and one or more Dewar vessels filled with liquid or solid nitrogen located within the optical resonator.

5. An apparatus as claimed in claim 4 in which capillaries acting as wave conductors and charged with solid and/or liquid nitrogen are provided into which the iodine laser beam is focused.

6. An apparatus as claimed in claim 4 or 5 wherein the laser tube is located between the poles of an electromagnetic coil, the coil extending in the longitudinal direction of the tube.

7. An apparatus as claimed in claim 6 wherein a polarisation filter is mounted within the iodine laser resonator, the direction of polarisation of the filter extending parallel to the direction of the magnetic field.

* * * * *